UNITED STATES PATENT OFFICE.

SPENCER B. NEWBERRY AND HARVEY N. BARRETT, OF BAYBRIDGE, OHIO.

PROCESS OF PRODUCING BARIUM OXID.

1,133,392. Specification of Letters Patent. Patented Mar. 30, 1915.

No Drawing. Application filed August 15, 1914. Serial No. 856,916.

*To all whom it may concern:*

Be it known that we, SPENCER B. NEWBERRY and HARVEY N. BARRETT, citizens of the United States, residing at Baybridge, in the county of Erie and State of Ohio, have invented a certain new and useful Improvement in Processes of Producing Barium Oxid, of which the following is a specification.

Our invention relates to the production of barium oxid from barium sulfate as it occures in nature, by a direct process comprising the use of high temperature on a finely divided and continuously agitated mass of barium sulfate, with or without the presence of added barium oxid.

The element barium occurs in nature chiefly in the form of sulfate ($BaSO_4$) as barite or heavy spar. This mineral is practically insoluble in acids, and somewhat complicated and costly processes have been hitherto found necessary to convert it into a condition practical for use in the arts.

As the result of experiments extending over several years we have found that barium sulfate may be practically completely converted into barium oxid simply by calcination at certain temperatures and under certain conditions without the presence of other substances except such as are derived from the process itself as applied to the material in question.

The reaction which takes place consists of the expulsion of sulfur dioxid and oxygen from the sulfate, leaving a residue of nearly pure oxids, as follows:

$$BaSO_4 = BaO + SO_2 + O.$$

The sulfur dioxid and oxygen are driven off and the resulting barium oxid may be used in any desired manner. It may be converted, if desired, into barium hydrate by treating with water, or into the chlorid or nitrate by dissolving the oxid or hydrate in hydrochloric or nitric acids respectively. The sulfur dioxid and oxygen evolved in the calcination may be condensed and utilized by well known methods.

In order to convert the sulfate practically completely into oxid it is necessary to subject the sulfate to very high temperature. At such high temperature however the material tends to fuse together, and the evolution of sulfur dioxid and oxygen is thereby hindered. This obstacle can be overcome by finely dividing the sulfate and keeping it agitated during the heating until the decomposition has so far proceeded that a sufficient amount of barium oxid has been formed to render the mixture infusible. A further remedy is to mix with the ground sulfate before calcination a certain amount of barium oxid, the product of the process. The presence of this oxid, either added to the sulfate or formed in the early stages of the calcination, reduces the fusibility of the sulfate and permits it to bear without fusion a degree of temperature at which it is rapidly and completely decomposed. The temperature should not be less than approximately 2700 degrees F. and the higher the temperature the more rapidly the conversion takes place. The material ought to be so finely divided that 90% of it will pass through a 100-mesh screen, and sufficient agitation of such material under such temperatures can be obtained by the action of a rotary kiln.

The above details are those of the process as we have worked it in what now appears to us to be the preferred method, though doubtless variation can be had within the general terms of this description of our invention without departing materially from the spirit of the invention.

Fusion is prevented in the first instance by the agitation and the finely divided character of the material and not only by these means but by the presence of a certain quantity of inert material, that is, the barium oxid already formed. It is therefore, possible to facilitate the operation, and it may be worked with less finely divided material and with less agitation by mixing with the raw material some of the barium oxid previously produced from this process. This permits the easy use of that high temperature which is necessary to drive off the sulfur dioxid while preventing the fusion of the material, which is the danger incident to the use of such temperatures.

The barium sulfate used in this process need not be pure, but may be ordinary native barite. The presence of a considerable percentage of silica or clay in the mineral is however, objectionable, especially if it is desired to make barium hydrate from the calcined oxid by treatment with water, since the product will contain more or less barium silicate which is but slowly attacked by water. If, on the other hand, the barium oxid is to be dissolved in acid to form chlorid or nitrate, the presence of a small amount of silica, say two or three per cent., will not be found detrimental.

In view of the readiness with which barium oxid attacks ordinary fire brick at high temperatures, it is important that the zone of high heat of the kiln in which the calcination of the sulfate takes place shall be lined with basic material, preferably magnesia brick.

As a practical example of the working of our process, we take ordinary native barite and pulverize it, either alone or with the addition of an equal weight of barium oxid obtained by the process herein described. The ground material is gradually and regularly fed in at the upper end of a slightly inclined revolving cylindrical kiln, lined with basic refractory material and heated internally by a flame of coal dust, oil or gas. As the material passes through the kiln it is gradually raised to an intense white heat and is continually agitated and turned over, presenting fresh surfaces to contact with the highly heated gases. Under these conditions sulfur dioxid and oxygen are rapidly expelled and pass out of the kiln with the stack gases, from which they may be condensed and recovered by certain methods which form no part of the present invention. The calcined material finally issues from the kiln in the form of rounded grains or masses, consisting almost wholly of barium oxid.

It is, of course, understood that the same result may be obtained by calcining barium sulfate until it is partially converted into oxid, grinding the resulting mixture to powder, and calcining the ground mixture until the conversion into barium oxid is completed.

We claim:

1. The process of making barium oxid which consists of mixing barium sulfate with barium oxid, pulverizing and heating the mixture with agitation until it is substantially converted into barium oxid with evolution of sulfur dioxid and oxygen.

2. The process of making barium oxid which consists of mixing barium sulfate with barium oxid, pulverizing and heating the mixture with agitation at approximately 2700° F. or over, until it is substantially converted into barium oxid with evolution of sulfur dioxid and oxygen.

3. The process of making barium oxid which consists of mixing barium with barium oxid and pulverizing the mixture until about 90 per cent. of it will pass through a 100-mesh sieve, and heating the mixture with agitation at approximately 2700° F. or over, until it is substantially converted into barium oxid with evolution of sulfur dioxid and oxygen.

Signed at Baybridge, Ohio, this 12th day of August, A. D. 1914.

SPENCER B. NEWBERRY.
HARVEY N. BARRETT.

Witnesses:
IRVIN H. NUBER,
CURTIS C. MYERS.